J. CURRY.
Improvement in Gates.
No. 132,809.   Patented Nov. 5, 1872.
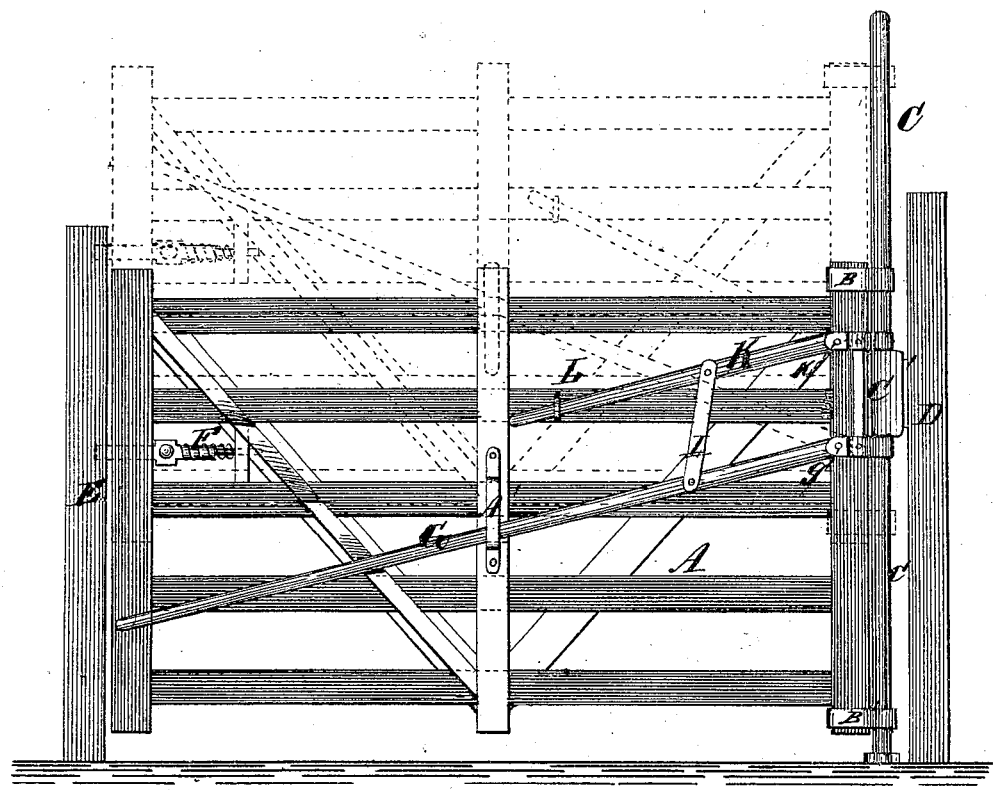
Attest
[signature]
W. Bradford
James Curry
Inventor
D. P. Holloway & Co
Att'ys

UNITED STATES PATENT OFFICE.

JAMES CURRY, OF SOUTH BEND, INDIANA.

IMPROVEMENT IN GATES.

Specification forming part of Letters Patent No. 132,809, dated November 5, 1872.

*To all whom it may concern:*

Be it known that I, JAMES CURRY, residing at South Bend, in the county of St. Joseph and State of Indiana, have invented a certain Improvement in Farm-Gates, of which the following is a specification:

This invention relates to that class of farm-gates which may be raised bodily and then swung while in such elevated position so as to clear obstructions in the way, as snow, &c. These gates are commonly raised by means of a lever turning upon a fulcrum on the gate-post and attached to the center stile of the gate; and, as it is necessary to have the handle of such lever as low down as possible when the gate is in its lowest position to enable a person to operate the gate to the best advantage, the point of attachment of the lever to the gate has heretofore been located below its center of gravity, which is a serious objection, because a gate thus suspended is liable to cant and bind on the spindle on which it swings to such an extent as to make it very difficult to raise it. My improvement is intended to overcome this objection, and still leave the operating-lever disposed in the most advantageous position; and it consists in connecting the lever by a link to a parallel bar above, which bar, instead of the lever, is attached at one end to the gate and above its center of gravity, so that, even though the gate be not exactly balanced upon this point of suspension, it will offer no serious frictional resistance in raising it.

The drawing represents an elevation of my improved gate, it being shown in dotted lines in an elevated position.

The inner stile of the gate A is provided near each end with straps or loops B and B', through which the spindle C passes, upon which the gate turns. This spindle is fastened to the post D near the upper loop B of the gate, and projects a considerable distance above the latter to allow it to be raised without becoming detached from the spindle. The post E has a vertical groove in its inner side throughout the greater part of its length from the top, which groove serves as a keeper for the spring-latch F on the gate. G is a lever turning upon a fulcrum, $g$, in the bracket H, which is pivoted on the spindle C and held in position thereon by the enlargement C' of the spindle, in the manner clearly illustrated. The lever extends in a diagonal and downward direction to the outer end of the gate, passing through a loop, A', thereon to prevent it from swinging around loosely; but it has not direct connection with the gate. The lever G is connected by the link I with a parallel bar, K, above it, turning upon a fulcrum, $k$, in the bracket H. The outer end of this bar passes through an eyebolt, L, which is secured to the gate some distance above its center of gravity, and vertically above the same as nearly as possible, so that the gate may hang true when suspended by the said eyebolt from the bar L. Thus in elevating or lowering the gate it will not bind on the spindle, and, even though it do not hang perfectly true, it will give no serious trouble to operate it. The lever G can be stationed on the rack M on the gate to hold the latter at any desired elevation in the ordinary manner.

What I claim as my invention, and desire to secure by Letters Patent, is—

The lever G, link I, and parallel bar K, in combination with the gate A, which is attached above its center of gravity to the parallel bar K, substantially as and for the purpose set forth.

In testimony whereof I have signed my name to this specification in the presence of two subscribing witnesses.

JAMES CURRY.

Witnesses:
 F. R. TUTT,
 GEO. H. ALWARD.